March 27, 1945.   O. E. ROSEN   2,372,604
DUAL DUPLICATOR
Filed July 8, 1941   2 Sheets-Sheet 1
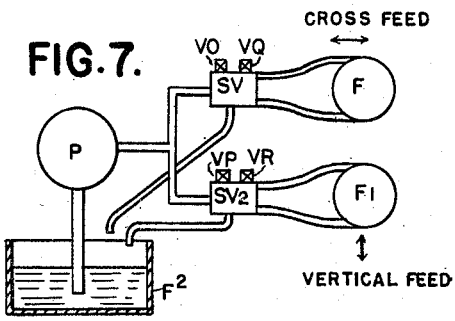
FIG.7.
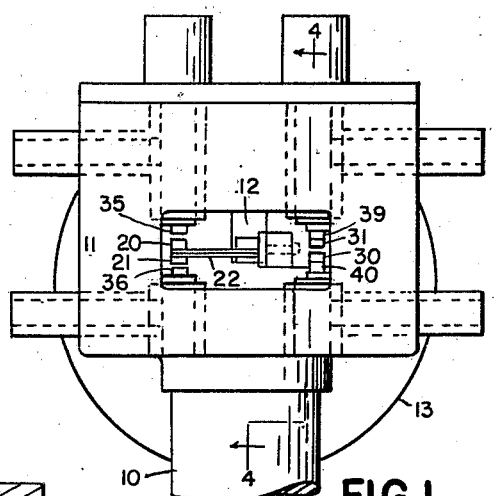
FIG.1.
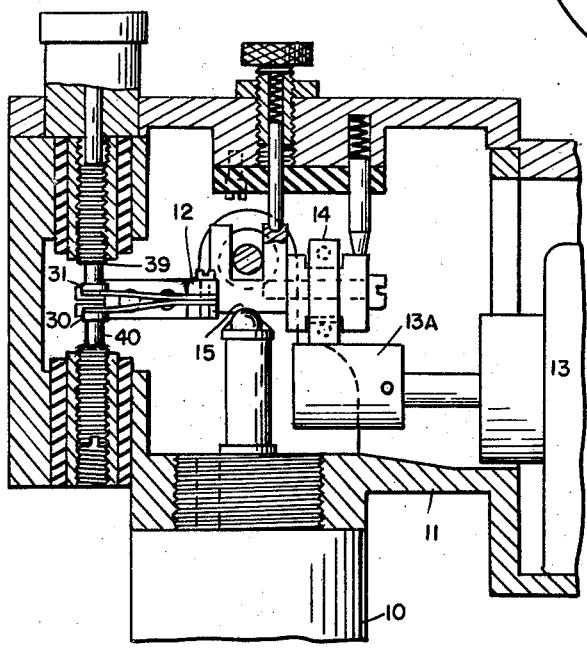
FIG.4.
FIG.3.
FIG.2.
INVENTOR.
OSCAR E. ROSEN
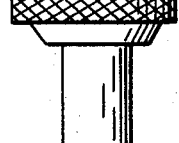
ATTORNEYS
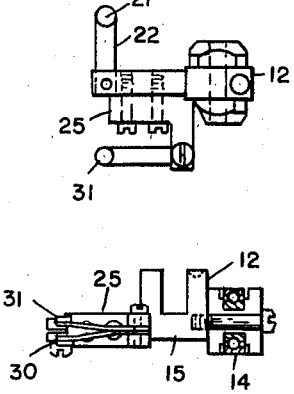

March 27, 1945.  O. E. ROSEN  2,372,604
DUAL DUPLICATOR
Filed July 8, 1941  2 Sheets-Sheet 2

INVENTOR.
OSCAR E. ROSEN
BY
ATTORNEYS

Patented Mar. 27, 1945

2,372,604

UNITED STATES PATENT OFFICE 2,372,604

DUAL DUPLICATOR

Oscar E. Rosen, Detroit, Mich.

Application July 8, 1941, Serial No. 401,497

4 Claims. (Cl. 90—62)

The present invention relates to so-called duplicating cutting machines for reproducing on the workpiece the contour of a pattern. The cutting machines to which the invention is to be applied, such for example, as a milling machine, are ordinarily provided with slides operable in three directions at right angles to each other.

The present invention relates to means for controlling the feed of two of such slides with a single tracer.

Another object is to so correlate the feeds of the slides as to provide a feed which is in inverse ratio to the steepness of the angle of cut.

Another object is a machine of the character indicated in which the cutter may be moved completely around the workpiece.

Another object is a device of the character indicated in which the direction of movement and the direction of control of the cutter by the tracer may be determined by the operator through the use of hand controls.

Still other objects will readily occur to those skilled in the art upon reference to the following description and the accompanying drawings in which Fig. 1 is an elevational view of a tracer used in the present invention, and constituting a part thereof.

Fig. 2 is a side elevation of the contact arm in said tracer.

Fig. 3 is a top plan view of the same.

Fig. 4 is a vertical sectional view on line 4—4 of Fig. 1.

Fig. 7 is a diagrammatic view indicating the operating means controlled by the present device.

Figure 6:
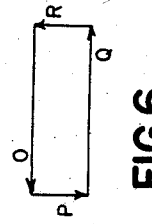
Fig. 6 is a small diagram indicating the direction of movement of the tracer in accordance with the button control.

In my Patent No. 2,138,208, issued Dec. 29, 1938, there is shown a cutting machine to which is applied a tracer controlled hydraulic motor for feeding one of the slides thereof. In this patent, there is shown a solenoid-operated two-way valve, the operation of which controls the direction of movement of a hydraulic motor which in turn operates a feed screw of the cutting machine.

In my Patent No. 2,162,491, issued June 13, 1939, there is shown a form of tracer which is suitable for operating such a feed unit, and in my application Serial No. 245,710, filed Dec. 14, 1938, there is shown an improved form of tracer.

In the present tracer the mechanism is substantially the same as that shown in the pending application, except that there are some additional contacts carried by the rocking member.

The present tracer consists of a barrel portion 10 carrying the head 11 in which is mounted a rocker arm 12 actuated by a cam 13A rotated by motor 13. The cam contacting the roller 14 produces the oscillation of the rocker arm about the point 15 in the manner directed in my previous application.

In the present device, the rocker arm carries, projecting laterally therefrom, two contacts 20 and 21 carried by spring arms 22. These arms are electrically connected to each other and to the rocker arm. The rocker arm 12 also has fixed thereto a block of insulating material 25 carrying a similar pair of contacts 31 and 30, likewise connected to each other electrically but of course insulated from contacts 20 and 21 through the block 25. The contacts 20 and 21 normally lie close together and in the rocking of the rocker arm may alternately strike contacts 35 and 36, while the contacts 31 and 30 are normally separated from each other and except under certain conditions, remain in contact with stationary contacts 39 and 40. The contacts 35, 36, 39 and 40 are connected to the several solenoids of the motor control valves as will be described later.

Instead of a single valve control feed unit, such as is shown in my previous patent, in the present installation there will be two of such units each controlling the feed of one of the slides of the cutting machine. There will therefore be four of the solenoids required to operate the two units.

Fig. 7 illustrates diagrammatically such an arrangement and indicates at P an electrically driven pump delivering fluid under pressure to two valve casings SV and SV2 each surmounted by a pair of solenoids. These solenoids VO, VP, VQ and VR through the circuits to be described cause the actuation of the valves in the casings SV and SV2 to direct the incoming fluid to the reversible motors F and F1, respectively, to drive these in one or the other of the directions indicated.

In the operation of the present device, referring to Fig. 1, the contacts 20 and 21 are the tracer control contacts while the contacts 30 and 31 are the feed control contacts, and when the tracer finger is resting lightly on the pattern so that it is moved very slightly upward, the oscillation of the arm 12 causes the contacts 20 and 21 to vibrate between the stationary contacts 35 and 36, making the circuit equally between them and of course alternately. Under such conditions, however, the contacts 30 and 31 remain against the stationary contacts 39 and 40 so that this circuit is not broken even intermittently. However, when the rocker arm is moved up or down, for example, when it is moved upwardly by striking a portion of the pattern presenting a sharp upward rise, the contact 20 remains for a considerable period against contact 35 and at the same time the contact 30 is pulled away from contact 40, thereby discontinuing the feed. It will be understood that such continuous contact between 20 and 35 and such break between 30 and 40 is not actually continuous but is intermittent due to the rapid movement of the arm 12.

With the tracer as described and with the two hydraulic motor feed units controlled by the four solenoids, it is possible to operate the cutter in four directions as indicated by Fig. 6, and at the same time cause the cutter to move in either of two directions so as to reproduce the contour of a suitable pattern. For example, the cutter and tracer may be moving in the direction O and at the same time be moved in the direction at right angles to this general movement under control of the tracer. The direction of general feed may then be changed for example to direction P while the tracer control causes the cutter and tracer point to move in the direction of right angles to this line.

By the operation of suitable manual control means, the cutter and tracer may be directed entirely around an object that is for example first in direction O, then in direction P, then in direction Q, and then in direction R.

In carrying out this result, it is necessary to change the electrical connections between the tracer and the solenoids so that when the feed is in direction O, for example, the tracer will be controlled in an up and down movement with relation to Fig. 6, while when the feed is in the direction Q, the tracer will need to be controlled in a down and up direction. That is, with the change in direction of feed from O to Q the tracer control must be reversed and the "down" movement or influence during the O movement or feed must be changed to an "up" movement or influence and correspondingly the "up" must be changed to "down."

Figure 5:
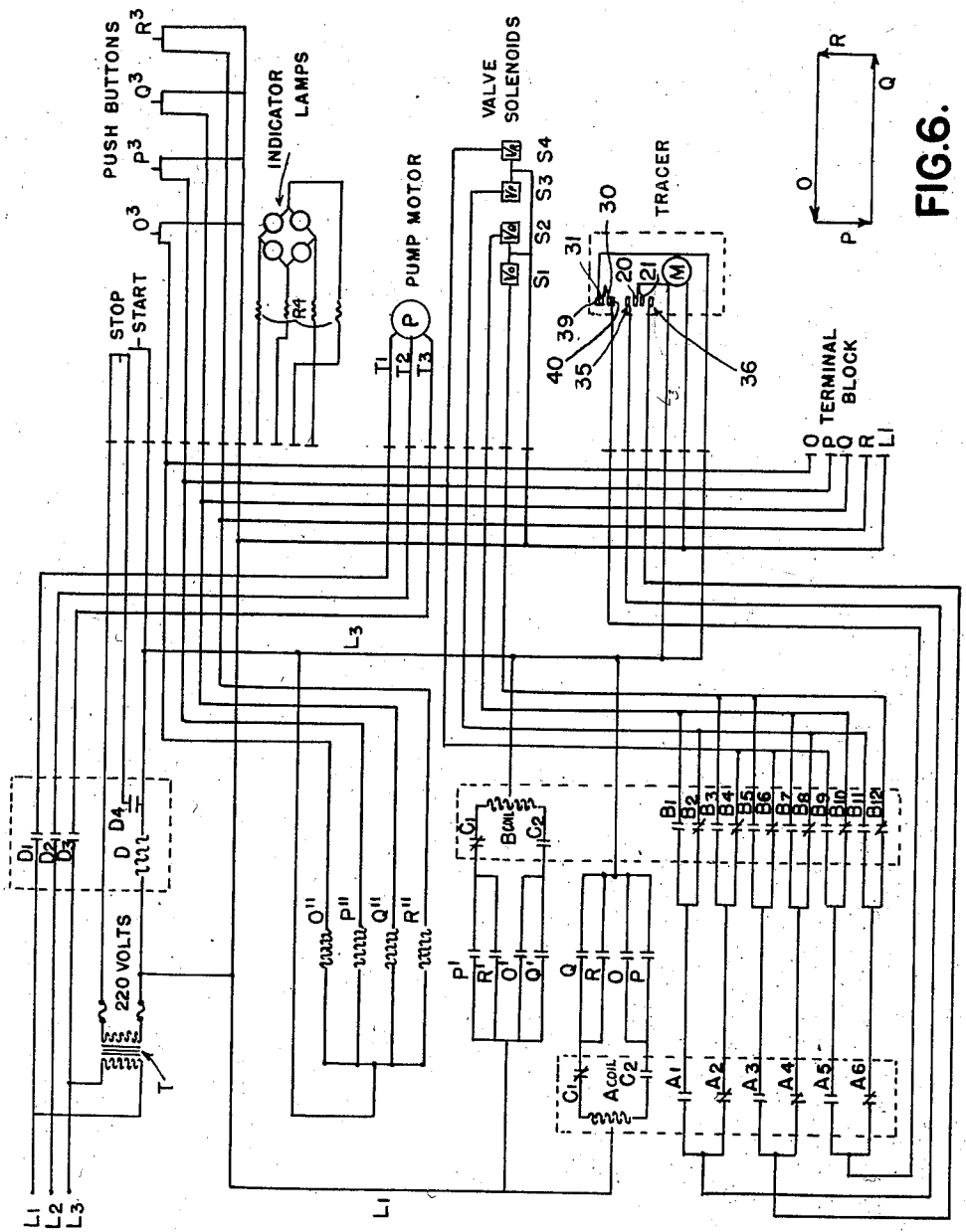
Fig. 5 is a wiring diagram.

Such electrical connections are indicated in the diagram shown in Fig. 5, which diagram has been drawn with related parts separated from each other for simplification. In this diagram, the power lines L', L2, L3, lead directly to the motor operating the fluid pump providing the fluid under pressure for operating the feed motor. D', D2 and D3 represent the conventional starting switch for the motor and will be connected in the usual manner to a starting button. A suitable transformer T will be used to reduce the voltage of the power line to provide current at a reduced voltage to the various coils used in the tracer, etc.

Down in the lower left hand corner of the diagram there is shown a plurality of switches indicated by A and a second series indicated by the letter B. Of these, it will be noted that the switches B are connected to the points Vo, Vq, Vp and Vr. These points Vo, Vq, Vp and Vr are the points of connection to the four valve solenoids for the two feed units.

The switches in the series A are in pairs and alternatively connected to the tracer as shown and likewise to the lines controlled by the switches in the B series, each of the A switches leading alternatively to two of the B switches. Further, the A switches are operable by the coil marked "A coil" and the B switches by the coil marked "B coil". And these latter—the A coil and B coil—are energized by the operation of the corresponding sets of switches marked O, P, Q and R, and O', P', Q', and R'. These in turn are actuated by the coils O", P", Q" and R" energized through the operation of the push buttons $O^3$, $P^3$, $Q^3$, and $R^3$.

The diagram shows at the top "Stop" and "Start" switches, the former being normally closed and the latter open. When the start button closes its circuit, current flow will be through the transformer T and coil D which is arranged to close contacts D4 and act as a holding coil. The same circuit may be utilized also to close and maintain closed the contacts D', D2 and D3, if desired.

The start button therefore energizes the pump motor and likewise the small motor M mounted on the tracer, and also provides for current through the several other portions of the system.

If it is desired to cause the machine to feed in the direction O in Fig. 6, the push button $O^3$ is actuated. This then energizes coil O" which closes switches O and O' and thereby energizes the lower halves of both the A coil and the B coil through switches C2. These in turn cause the closing of switches $A_2$, $A_4$, $A_6$ and switches $B_2$, $B_4$, $B_6$, $B_8$, $B_{10}$, $B_{12}$, but switches $B_2$, $B_6$ and $B_{10}$ are dead since the switches $A_1$, $A_3$ and $A_5$ are open.

Switch B4 is connected to valve solenoid Vr, switch B8 is connected to valve solenoid Vp and switch B12 is connected to valve solenoid Vo. Of these valve solenoids thus connected by the operation of button $O^3$, Vo is the feed control valve solenoid, and, since only one direction of feed takes place, the fourth valve solenoid is not utilized.

The other two valve solenoids are the tracer control solenoids and are connected back through switches B4 and B8 to contacts 35 and 36 respectively, these being the contacts in the tracer coacting with the oscillating contacts 20 and 21. The solenoid Vo is connected back through switch B12 to contact 39 of the tracer. So long therefore as the feed contacts 30 and 39 remain together, the feed of the work to the cutter in the direction O will continue. In the meantime, the contour of the pattern being followed by the tracer finger causes the vibration of the arm 22 between the contacts 35 and 36, and if no abrupt rise or fall of the pattern is encountered, the solenoid Vo will be constantly energized. If, however, an abrupt rise is encountered by the tracer finger, the contact between points 30 and 39 will be broken and consequently the solenoid Vo deenergized or intermittently so, so that the feed in the direction O will be slowed down or discontinued and such slowing down will be in inverse ratio to the steepness of the angle encountered by the tracer finger.

When the end of the pattern has been reached by the feeding in the direction O and it is desired to proceed along the direction P, the push button $P^3$ is actuated, and the coil P" is energized resulting in the closing of switches P' and P. When these switches are closed, the upper half of the B coil and the lower half of the A coil become energized with the result that the lower switches in the A series close or remain closed while the upper switches of the B series are closed.

The result of this is that we have closed switches $A_2$, $A_4$, $A_6$ and $B_1$, $B_3$, $B_5$, $B_7$, $B_9$ and $B_{11}$, and of these, switches $B_1$, $B_5$ and $B_9$ are dead, while circuit is completed through the other B switches. In this condition, we have the valve solenoids Vo and Vq and Vp energized with Vr connected back through B11 and A6 to the contact 39 of the tracer. We also have tracer contact 35 connected to valve solenoid Vo and tracer contact 36 connected through A4 and B6 to valve solenoid Vq.

This results in the feed along the direction P (Fig. 6) while the tracer will control the contour.

When the end of the line P has been reached and it is desired to feed along the line Q, the Q3 button is pushed. This actuating coil Q'' closes switches Q and Q' and energizes the upper half of the A coil, and the lower half of the B coil which results in the closing of switches A', A3, A5, and B2, B4, B6, B8, B10 and B12. Of the B switches, in this case, B4, B8 and B12 will be dead. We now have the situation in which the valve solenoid Vp will be connected back through B2 and A' to contact 35, while the valve solenoid Vr will be connected back through B6 and A3 to contact 36. Likewise the valve solenoid Vq will be connected back through B10 and A' to contact 39 of the tracer. With such an arrangement, the feed will be along the direction Q (Fig. 6), while the tracer controls the contour.

When the button R3 is pushed and the coil R'' energized, the switches R and R' are energized with the result that the upper half of the A coil and the upper half of the B coil are energized. Under these conditions we have the valve Vq connected back through B' and A' to contact 35; the valve solenoid Vo is connected back through B5 and A3 to contact 36 and the valve solenoid Vr is connected back through B9 and A5 to contact 39.

The diagram also indicates that suitable indicator lamps in series with suitable resistances R4 may be used to indicate which of the four push buttons has been actuated.

It is also indicated on the diagram that in addition to the push buttons the several coils O'', P'', Q'' and R'' may be controlled by the application of suitable other and automatic devices if so desired. For example, a series of limit switches may be connected to the slides of the cutting machine and the leads from such switches connected to a suitable terminal block applicable to the circuit at the point indicated on the diagram by the words "Terminal Block."

I claim:

1. In a tracer for duplicating machines, a pair of electric contacts in spaced relation, an arm carrying a third contact movable from one of said first contacts to the other, a second set of stationary contacts spaced from each other and a second contact carried by said arm and normally remaining in contact with said stationary contacts but movable therefrom under excessive movement of the first movable contact.

2. In a tracer for duplicating machines having an oscillatable arm and means for rapidly oscillating said arm, an electric contact member carried by one end of said arm, and a pair of stationary contacts between which said movable contact is adapted to oscillate, a second pair of contacts carried by said oscillatable arm and electrically connected to each other, a second pair of stationary contacts between which said latter movable contacts are located, said second pair of movable contacts being carried on arms spaced apart so that they normally rest against the adjacent stationary contacts.

3. In a tracer for duplicating machines, having a lever mounted for oscillation and for movement parallel to itself through the action of the tracer finger, a pair of stationary electric contacts in opposed relation, a first pair of movable electrical contacts carried by said lever and arranged between said stationary contacts, whereby oscillation of said lever tends to cause alternate completion of circuits through said stationary contacts, a second pair of stationary contacts in opposed relation, a second pair of movable contacts carried by said lever and insulated from the first, said second pair of movable contacts adapted to coact with the second pair of stationary contacts and mounted for constant circuit completing relation with the second stationary pair, means for impairing continuous oscillation to said lever and means whereby said circuit through the second group of contacts is broken upon movement of said lever parallel to itself.

4. In a tracer for duplicating machines, having an oscillatable lever and means for producing continuous oscillation thereof, and having a tracer finger constructed and arranged to move said lever parallel to itself, a cross arm upon one end of said lever, said cross arm consisting of laterally extending spring members, the members forming one end of said arm being electrically insulated from those forming the other end of said arm, contact members carried by said spring members above and below, stationary contacts arranged in position to coact with the lever carried contact members, the spring members on one side of said lever being adjusted for alternate contact with its coacting stationary contacts and the spring members on the other side of said lever being adjusted normally to maintain contact with their stationary coacting contacts but permit breaking away upon excessive parallel movement of said lever by the tracer finger.

OSCAR E. ROSEN.